(12) United States Patent
Penkkimäki

(10) Patent No.: US 11,090,842 B2
(45) Date of Patent: Aug. 17, 2021

(54) VALVE INSERT AND AIR VENTING VALVE

(71) Applicant: WD RACING OY, Siuro (FI)

(72) Inventor: Pekka Penkkimäki, Siuro (FI)

(73) Assignee: WD RACING OY, Siuro (FI)

( * ) Notice: Subject to any disclaimer, the term of this patent is extended or adjusted under 35 U.S.C. 154(b) by 56 days.

(21) Appl. No.: 16/604,637

(22) PCT Filed: Apr. 12, 2018

(86) PCT No.: PCT/FI2018/050264
§ 371 (c)(1),
(2) Date: Oct. 11, 2019

(87) PCT Pub. No.: WO2018/189424
PCT Pub. Date: Oct. 18, 2018

(65) Prior Publication Data
US 2021/0129390 A1    May 6, 2021

(30) Foreign Application Priority Data
Apr. 12, 2017 (FI) ........................ 20175342

(51) Int. Cl.
*B29D 30/06* (2006.01)
*B29C 33/10* (2006.01)
(Continued)

(52) U.S. Cl.
CPC .......... *B29C 33/10* (2013.01); *B29D 30/0606* (2013.01); *F16K 15/063* (2013.01);
(Continued)

(58) Field of Classification Search
CPC ............ B29D 30/0606; B29D 30/0662; B29D 2030/0617; B29C 33/10
See application file for complete search history.

(56) References Cited

U.S. PATENT DOCUMENTS 4,492,554 A * 1/1985 Carter .................... B29C 33/10
425/28.1
6,871,831 B1    3/2005 Cuny
(Continued)

FOREIGN PATENT DOCUMENTS

CN    201483675    5/2010
CN    201633153    11/2010
(Continued)

OTHER PUBLICATIONS

Extended European Search Report dated Nov. 2, 2020.
International Search Report and Written Opinion for PCT/FI2018/050264, dated Jun. 4, 2018.

*Primary Examiner* — James P Mackey
(74) *Attorney, Agent, or Firm* — The Small Patent Law Group LLC; Joseph M. Butscher

(57) ABSTRACT

A valve insert (4) for use in an air venting valve (1) of a vulcanizing mould of a vehicle tyre, which valve insert (4) comprises a valve stem (6) arranged to be inserted into a valve sleeve (3) of the air venting valve (1), a first end of which valve stem (6) is provided with a valve disk (7) and a second end of which valve stem (6) is provided with an elastically compressible retainer member (8) for detachably attaching the valve insert (4) to the valve sleeve (3) and for limiting an opening stroke of the valve insert (4). The retainer member (8) comprises a stop surface (14) which is arranged to abut an end surface (16) of the valve sleeve (3) and thus limit the opening stroke of the valve insert (4).

16 Claims, 2 Drawing Sheets

(51) Int. Cl.
*F16K 15/06* (2006.01)
*F16K 24/04* (2006.01)
(52) U.S. Cl.
CPC .......... *F16K 24/04* (2013.01); *B29D 30/0662* (2013.01); *B29D 2030/0617* (2013.01)

(56) References Cited

U.S. PATENT DOCUMENTS

| | | | | |
|---|---|---|---|---|
| 7,645,131 | B2 * | 1/2010 | Hajd ch | B29D 30/0662 425/28.1 |
| 8,287,260 | B2 * | 10/2012 | Penkkimaki | B29C 33/10 425/28.1 |
| 9,873,234 | B2 * | 1/2018 | Ohara | B29D 30/0606 |
| 10,006,554 | B2 * | 6/2018 | Seo | B29D 30/0606 |

FOREIGN PATENT DOCUMENTS

| | | | |
|---|---|---|---|
| CN | 101676085 | | 11/2012 |
| CN | 106246928 | | 12/2016 |
| DE | 10050195 | | 2/2002 |
| DE | 10 2011 053 207 | * | 3/2013 |
| EP | 0774333 | | 1/2001 |
| EP | 1998946 | | 4/2010 |
| KR | 200460078 | | 5/2012 |
| KR | 2013004969 | | 8/2013 |
| WO | WO 2007100308 | | 9/2007 |

\* cited by examiner

VALVE INSERT AND AIR VENTING VALVE

This application is a National Phase of International Application No. PCT/FI2018/050264, filed Apr. 12, 2018, which relates to and claims priority benefits from FI Application No. 20175342, filed Apr. 12, 2017, both of which are hereby incorporated by reference in their entireties.

The invention relates to a valve insert of an air venting valve and an air venting valve for removing air from a vulcanizing mould, for example from a vulcanizing mould of a vehicle tyre.

In vulcanising moulds of vehicle tyres a tyre blank smaller than the inner dimensions of the mould is placed inside the mould, after which the mould is closed. After closing, the tyre blank is caused to expand, whereby it presses against the surface of the mould in its plastic state getting the size and shape of a tyre. During the vulcanizing process, air between the tyre blank and the mould surface has to be removed in order for the surface of the tyre blank to come into a tight contact with the mould surface. The vulcanizing mould comprises venting bores through which air can be removed from the space between the tyre blank and the mould surface. Typically the vulcanizing mould comprises several hundreds of venting bores for removing air completely at each point of the mould so that no air pockets remain between the tyre and the mould.

A drawback in the use of the venting bores is that rubber material of the tyre material flows into the venting ducts during the vulcanization process. As a result, the outer surface of the finished tyre comprises threadlike projections that must be removed after the vulcanization, which increases the manufacturing costs and time of the tyre. Alternatively, the projections can be left on the tyre surface, which in turn weakens the aesthetic appearance of the tyre. The threadlike projections may also break off and remain in the venting bore which impairs or prevents the air removal from the mould.

The venting bores of the vulcanization mould can be provided with venting valves to prevent entry of tyre material into the venting bores during the vulcanization process. The venting valve typically comprises a valve sleeve and a venting duct arranged inside the valve sleeve. A movable valve insert provided with a valve disc is placed in the venting duct. A coil spring for pressing the valve disc away from the mould wall towards the tyre blank is arranged around the valve insert. Thus, air is able to exit from the mould via a clearance between the valve disc and the valve sleeve and further via a clearance between the stem of the valve insert and the inner surface valve sleeve. As the tyre material being vulcanized moves towards the mould surface, it pushes the valve disc towards the closed position and finally presses the valve disk against the valve sleeve thus closing the venting duct so that the tyre material being vulcanised cannot access the venting duct. The coil spring opens the air venting valve while the tyre blank is being removed from the mould.

EP 774 333 B, FIG. 5 discloses a venting valve which is provided with a detachable valve insert which can be removed from the valve sleeve. The valve insert comprises a conical valve disk and conical counter surface on the valve sleeve. Additionally, the valve insert comprises a compressible retainer member, which can be compressed and thus remove the valve insert from the valve sleeve. The retainer member comprises a conical abutment surface which comes into contact with the end of the valve sleeve when the valve is opened and thus limits the opening stroke of valve insert.

EP 1998946 B discloses a venting valve which is also provided with a detachable valve insert. The valve sleeve is elastic to facilitate the removal and insertion of the valve member.

The drawback of the above described venting valves is that the valve insert has two conical surfaces, the lower surface of the valve disk and the abutment surface of the retainer member, which have high dimensional accuracy requirements in order to maintain the opening stroke of the valve within desired limits. Since the fabrication of dimensionally accurate conical surfaces is difficult, the opening stroke of the valves may be beyond the allowed limits.

The object of the present invention is to provide a solution by means of which the above described problems can be reduced.

The object according to the invention can be achieved by a valve insert according to claim 1 and an air venting valve according to claim 10.

The valve insert according to the invention comprises a valve stem arranged to be inserted into a valve sleeve of the air venting valve. A first end of the valve stem is provided with a valve disk and a second end of the valve stem is provided with an elastically compressible retainer member for detachably attaching the valve insert to the valve sleeve and for limiting an opening stroke of the valve insert. The retainer member comprises a stop surface which is arranged to contact an end surface of the valve sleeve and thus limit the opening stroke of the valve insert.

Significant advantages can be achieved by means of the invention. According to an embodiment of the invention the valve insert according to the invention comprises a stop surface that is perpendicular to the longitudinal axis of the valve insert. This kind of a straight stop surface is easier to fabricate to the desired dimensions than a conical stop surface utilized in the conventional venting valves. Consequently, the opening stroke of the venting valve can be maintained within the desired limits.

According to another embodiment of the invention the valve stem comprises at least cutout which increases the clearance between the outer surface of the valve stem and the inner surface and the outlet opening of the valve sleeve and thus increase the venting through the valve sleeve.

BRIEF DESCRIPTION OF THE DRAWINGS

In the following, the invention will be described in more detail by means of examples with reference to the attached drawings, wherein

FIGS. 1 and 2 show a venting valve 1 for removing air from a vulcanizing mould, e.g. a vulcanizing mould of a vehicle tyre. Typically the vulcanizing mould comprises 1000-4000 venting valves 1. The venting valve 1 comprises a valve sleeve 3 and a valve insert 4 inserted into the valve sleeve 3. The valve sleeve 3 is attached to a venting bore of the vulcanizing mould e.g. by a press fit. The valve sleeve 3 is cylindrical. The outer diameter of the valve sleeve 3 is typically 1.5-4 mm. In FIG. 2 the valve sleeve 3 is shown as a cross section.

Figure 1:
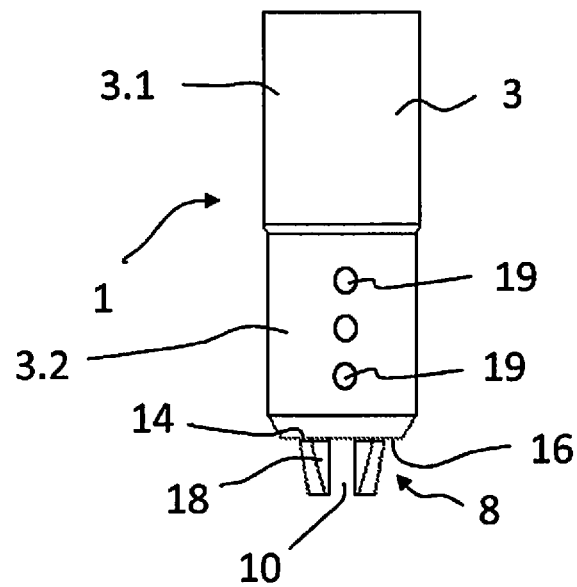
FIGS. 1 and 2 show an air venting valve according to an embodiment of the invention.
Figure 2:
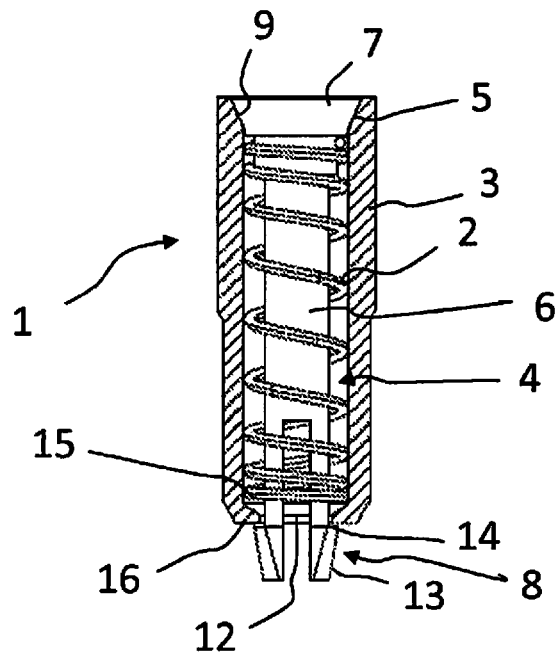
Figure 3:
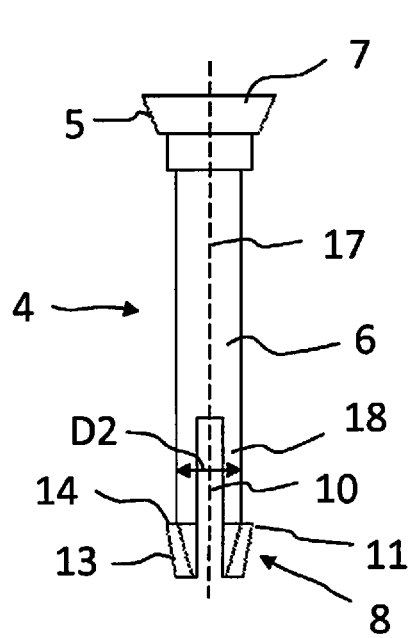
FIG. 3 shows a side view of a valve insert of the air venting valve of FIGS. 1 and 2.
Figure 4:
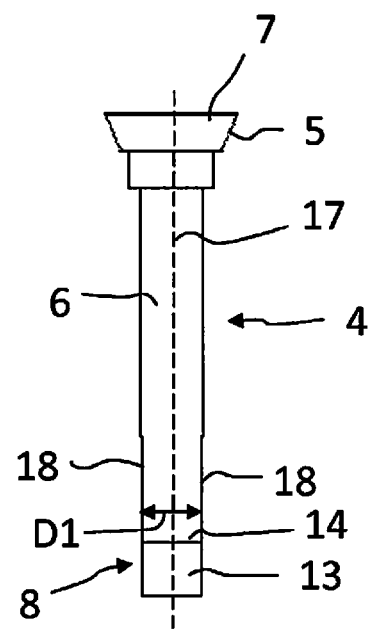
FIG. 4 shows another side view of the insert of the air venting valve of FIGS. 1 and 2, rotated 90 degrees relative to the side view of FIG. 3.
Figure 5:
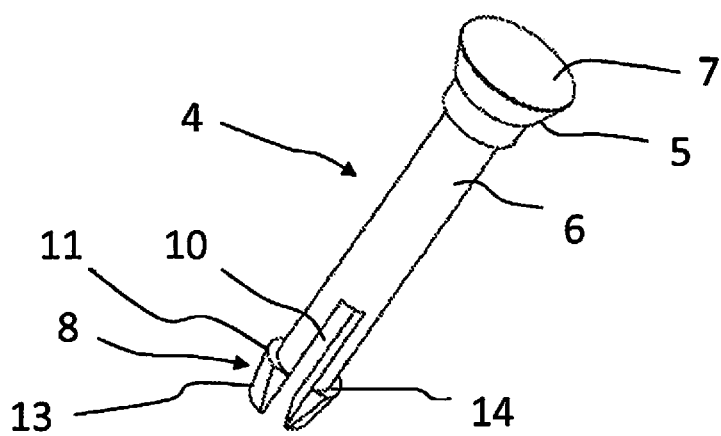
FIG. 5 shows the valve insert of FIGS. 1 and 2.

The valve insert 4 comprises a valve stem 6, the first end of which is provided with a valve disk 7 and the second end with a mechanism or means 8 for detachably attaching the valve insert 4 to the valve sleeve 3. The valve insert 4 is attached to the valve sleeve 3 by a detachable connection. The valve insert 4 is shown in more detail in FIGS. 3-5. The first end of the valve sleeve 3 comprises a conical seat surface 9 against which a conical surface 5 of the valve disk 7 is arranged in the closed position of the venting valve 1 as shown in FIGS. 1 and 2.

The venting valve 1 comprises a spring 2 for moving valve insert 4 towards an open position in which the conical surface 5 of the valve disk 7 is at a distance from the conical surface 9 of the valve sleeve 3. The spring 2 is a helical spring that is arranged around the valve stem 6. One end of the spring 2 is against the lower surface of the valve disk 7 and the other end against the support surface 15 of the valve sleeve 3.

The means for detachably attaching the valve insert to the valve sleeve comprises an elastically compressible and/or elastically deformable retainer member 8 provided at the second end of the valve stem 6. The retainer member 8 is arranged to be compressed when the valve insert 4 is inserted into the valve sleeve 3 and the retainer member 8 is inserted through the outlet opening 12 of the valve sleeve 3.

The valve insert 4 comprises a slot 10 at the second end of the valve stem 6, by means of which the compression of the retainer member 8 is achieved. The slot 10 extends from the second end of the valve stem 6 towards the first end of the valve stem 6. The slot 10 extends through the valve stem 6 in the radial direction. The radial direction is perpendicular to a longitudinal axis 17 of the valve stem. Additionally, the retainer member 8 comprises a collar 11. The slot 10 extends through the collar 11.

The outer diameter of the collar 11 in the uncompressed state of the retainer member 8 is larger than the inner diameter of the outlet opening 12 of the valve sleeve 3. The collar 11 comprises a conical surface 13, which is arranged to abut the edge of the opening 12, when the valve insert 4 is inserted into the valve sleeve 3 and the collar 11 passes through the outlet opening 12.

Further, the retainer member 8 comprises a stop surface 14, which is arranged to abut the end surface 16 of the valve sleeve 3, when the valve insert 4 is moved towards the open position, and thus limit the opening stroke of the valve insert 4. The stop surface 14 faces the valve disk 7. The stop surface 14 is perpendicular to the longitudinal axis 17 of the valve insert. The stop surface 14 is parallel to the end surface 16 of the valve sleeve against which the stop surface 14 is arranged in the fully open position of the venting valve 1. The longitudinal axis 17 of the valve insert 4 is parallel to the direction of the opening and closing motion of the valve insert 4. When the valve disk 7 is against the seat surface 9, the stop surface 14 is at a distance from the end surface 16 of the valve sleeve 3. When the stop surface 14 is against the end surface 16 of the valve sleeve, the conical surface 5 of the valve disk is at a distance from the seat surface 9. The stop surface 14 is flat or straight. The end surface 16 of the valve sleeve is flat or straight.

The valve stem 6 comprises at least one cutout 18 for increasing air removal from the valve sleeve 3 through the outlet opening 12 and air flow rate through the valve sleeve 12. The cutout 18 extends from the second end of the valve stem 6 or from the retainer member 8 towards the valve disk 7. The cutout extends through the outlet opening 12 of the valve sleeve 3 when the valve insert 4 is in the open position. The diameter D1 of the valve stem 6 at the location of the cutout 18 is smaller than the diameter D2 of the valve stem 6 at a location adjacent to the cutout 18 in the circumferential direction of the valve stem 6. The diameter D1 of the retainer member 8 at the location of the cutout 18 is smaller than the diameter of the outlet opening 12. The diameter of the retainer member 8 at a location adjacent to the cutout 18 is larger than that of the outlet opening 12 when the retainer member 8 is in the uncompressed state. The surface of the cutout 18 is straight. The cutout 18 increases the cross-sectional air flow area through the venting valve 1. The cutout 18 extends to the level of the bottom of the slot 10.

In the embodiment shown in the drawings the valve stem 6 comprises two cutouts 18. The cutouts 18 are arranged on the opposite sides of the valve stem 6. The cutout surfaces on the opposite sides of the valve stem 6 are parallel. The cutouts are identical. Typically, the valve stem 6 comprises 1 to 4 cutouts 18 as described above.

The wall of the valve sleeve 3 comprises at least one hole 19, typically a plurality of holes 19, for increasing air removal from the valve sleeve 3. The hole 19 extends through the wall of the valve sleeve 3. The hole 19 extends from the inner surface of the valve sleeve 3 to the outer surface of the valve sleeve 3. The valve sleeve 3 comprises an upper portion 3.1 and a lower portion 3.2. The outer diameter of the lower portion 3.2 is smaller than that of the upper portion 3.1. The hole 19 or holes 19 are located in the lower portion 3.2 of the valve sleeve. Thus, air is discharged from the valve sleeve 3 through the hole(s) 19 and through the gap between the lower portion 3.2 and the venting bore of the vulcanizing mould. The holes 19 are arranged side by side in the circumferential direction of the valve sleeve 3 and/or one on the other.

The valve insert 4 and the spring 2 around the valve insert 4 are installed into the valve sleeve 3 such that the retainer member 8 is inserted into the valve sleeve 3 through the inlet opening of the first end of the valve sleeve 3. The conical surface 13 of the retainer member 8 abuts the edge of the outlet opening 12 of the second end of the valve sleeve 3 and is elastically compressed such that the retainer member 8 can be brought through the outlet opening 12.

The valve insert 4 is detached from the valve sleeve by compressing the retainer member 8 such that it can be brought inside the valve sleeve 3 through the outlet opening 12. The retainer member 8 is compressed e.g. by a tool having a conical opening or recess dimensioned to compress the retainer member 8. Thereafter, the valve insert 4 and the spring 2 can be removed from the valve sleeve 3.

The invention claimed is:

1. A valve insert for use in an air venting valve of a vulcanizing mould of a vehicle tyre, which valve insert comprises a valve stem configured to be inserted into a valve sleeve of the air venting valve, a first end of which valve stem is provided with a valve disk and a second end of which valve stem is provided with an elastically compressible retainer member for detachably attaching the valve insert to the valve sleeve and for limiting an opening stroke of the valve insert, and wherein the retainer member comprises a stop surface configured to abut an end surface of the valve sleeve and thus limit the opening stroke of the valve insert, wherein the valve stem comprises at least one cutout for improving air removal from the valve sleeve, wherein the at least one cutout extends from and through the second end of the valve stem towards the first end of the valve stem, wherein the first end is opposite from the second end, wherein the retainer member comprises a slot for achieving the compression of the retainer member, which slot extends a first level from the second end of the valve stem towards the first end of the valve stem, wherein the at least one cutout extends a second level from the second end of the valve stem towards the first end of the valve stem, and wherein the second level is substantially the same as the first level.

2. The valve insert according to claim 1, wherein the stop surface is perpendicular to a longitudinal axis of the valve stem.

3. The valve insert according to claim 1, wherein the stop surface is straight.

4. The valve insert according to claim 1, wherein the slot extends through the valve stem in a radial direction.

5. The valve insert according to claim 1, wherein the diameter of the valve stem at a location of the at least one cutout is smaller than the diameter of the valve stem at a location adjacent to the cutout.

6. The valve insert according to claim 1, wherein a surface of the at least one cutout is straight and/or parallel to the longitudinal axis of the valve stem.

7. The valve insert according to claim 1, wherein the at least one cutout is configured to extend through an outlet opening of a valve sleeve when the valve insert is in an open position.

8. The valve insert according to claim 1, wherein the at least one cutout comprises:
a first cutout; and
a second cutout.

9. The valve insert according to claim 8, wherein the first cutout is on a first side of the valve stem, and the second cutout is on a second side of the valve stem, and wherein the first side is opposite from the second side.

10. The valve insert according to claim 8, wherein the first cutout is parallel with the second cutout.

11. The valve insert according to claim 8, wherein the first cutout and the second cutout have a size, a shape, and a length that are the same.

12. A venting valve for removing air from a vulcanizing mould of a vehicle tyre, which air venting valve comprises a valve sleeve, and wherein the valve insert according to claim 1 is detachably attached to the valve sleeve.

13. The venting valve according to claim 12, wherein an end surface of the valve sleeve is parallel to the stop surface of the valve insert.

14. The venting valve according to claim 12, wherein the at least one cutout of the valve stem extends through an outlet opening of the valve sleeve.

15. The venting valve according to claim 12, wherein a wall of the valve sleeve comprises a hole or holes for improving air removal from the valve sleeve.

16. The venting valve according to claim 15, wherein the hole or holes are located in a lower portion of the valve sleeve that has a smaller outer diameter than an upper portion of the valve sleeve.

* * * * *